(12) United States Patent
Uchikawa

(10) Patent No.: US 11,722,454 B2
(45) Date of Patent: Aug. 8, 2023

(54) COMMUNICATION APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventor: Shinichi Uchikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/336,058

(22) Filed: Jun. 1, 2021

(65) Prior Publication Data

US 2021/0400010 A1 Dec. 23, 2021

(30) Foreign Application Priority Data

Jun. 17, 2020 (JP) .................................. 2020-104675

(51) Int. Cl.
*H04L 61/10* (2022.01)
*H04N 1/327* (2006.01)
(Continued)

(52) U.S. Cl.
CPC ............ *H04L 61/10* (2013.01); *H04L 45/745* (2013.01); *H04L 61/4511* (2022.05); *H04N 1/32771* (2013.01)

(58) Field of Classification Search
CPC ... H04L 61/10; H04L 45/745; H04L 61/1511; H04N 1/32771
See application file for complete search history.

(56) References Cited

U.S. PATENT DOCUMENTS

2003/0061345 A1* 3/2003 Kawasaki ............... H04L 41/06
709/224
2005/0204064 A1* 9/2005 Ruiz ................... H04L 61/4511
709/245
(Continued)

FOREIGN PATENT DOCUMENTS

JP 2005151314 A * 6/2005 ......... H04L 12/5692
JP 2005151314 A 6/2005
(Continued)

*Primary Examiner* — Oleg Survillo
*Assistant Examiner* — Monishwar Mohan
(74) *Attorney, Agent, or Firm* — Canon U.S.A., Inc. I.P. Division

(57) ABSTRACT

A communication apparatus transmits data externally via different communication interfaces by performing operations including externally transmitting a request for a name resolution of a hostname, identifying a communication interface, and registering, in a routing table, routing information. The name resolution request is transmitted in a case where a request for the name resolution of the hostname is received from an application of the communication apparatus. The communication interface identity arises where the name resolution of the hostname request has been externally transmitted and the name resolution of the hostname is successfully executed. The identified communication interface is associated with a Domain Name System (DNS) server by which the name resolution of the hostname is successfully executed. The registered routing information is for communicating with an external apparatus identified by an Internet Protocol (IP) address acquired as a result of the name resolution of the hostname via the identified communication interface.

23 Claims, 11 Drawing Sheets

(51) Int. Cl.
*H04L 45/745* (2022.01)
*H04L 61/4511* (2022.01)

(56) References Cited

U.S. PATENT DOCUMENTS

| | | | |
|---|---|---|---|
| 2017/0230327 A1* | 8/2017 | Mihara | H04L 67/02 |
| 2019/0253384 A1* | 8/2019 | Furuta | H04L 61/3005 |
| 2019/0356628 A1* | 11/2019 | Iwata | H04J 3/0667 |
| 2020/0296244 A1* | 9/2020 | Hirayama | G06V 10/751 |

FOREIGN PATENT DOCUMENTS

| | | | |
|---|---|---|---|
| JP | 2010193015 A | * | 9/2010 |
| JP | 2010193015 A | | 9/2010 |

\* cited by examiner

FIG.9A

| Destination | Gateway | Genmask | Interface | |
|---|---|---|---|---|
| 0.0.0.0 | 192.168.250.2 | 0.0.0.0 | eth1 | ~901 |
| 192.168.250.0 | * | 255.255.255.0 | eth1 | ~902 |
| 172.24.10.0 | * | 255.255.255.0 | eth2 | ~903 |
| 210.210.10.4 | 172.24.10.1 | 255.255.255.255 | eth2 | ~904 |

FIG.9B

| Destination | Gateway | Genmask | Interface | |
|---|---|---|---|---|
| 0.0.0.0 | 192.168.250.2 | 0.0.0.0 | eth1 | |
| 192.168.250.0 | * | 255.255.255.0 | eth1 | |
| 172.24.10.0 | * | 255.255.255.0 | eth2 | |
| 210.210.10.4 | 172.24.10.1 | 255.255.255.255 | eth2 | |
| 210.210.20.20 | 172.24.10.1 | 255.255.255.255 | eth2 | ~905 |

# COMMUNICATION APPARATUS, METHOD OF CONTROLLING COMMUNICATION APPARATUS, AND STORAGE MEDIUM

BACKGROUND

Field

The present disclosure relates to a communication apparatus that externally transmits data.

Description of the Related Art

In recent years, it has become common to use a plurality of different local area networks (LANs) in an office or a commercial facility for the purposes of network security and complicated functionality.

Japanese Patent Application Laid-Open No. 2010-193015 discusses a method for efficiently executing a name resolution of a domain name in an environment where client terminals are connected to a plurality of networks in which management of domain names is performed.

Further, Japanese Patent Application Laid-Open No. 2005-151314 discusses a method in which a router transmits a name resolution inquiry to a Domain Name System (DNS) server on each route to select a route optimum for requested communication, selects a route with high priority from among routes each having a DNS server that has returned a response to the inquiry, and performs communication using the selected route.

SUMMARY

According to an aspect of the present disclosure, a communication apparatus configured to transmit data externally via a plurality of different communication interfaces includes at least one processor to execute a set of instructions to cause the communication apparatus to perform operations including externally transmitting a request for a name resolution of a hostname in a case where a request for the name resolution of the hostname is received from an application of the communication apparatus, identifying a communication interface in a case where the name resolution of the hostname request has been externally transmitted and the name resolution of the hostname is successfully executed, wherein the identified communication interface is associated with a Domain Name System (DNS) server by which the name resolution of the hostname is successfully executed, and registering, in a routing table, routing information for communicating with an external apparatus identified by an Internet Protocol (IP) address acquired as a result of the name resolution of the hostname via the identified communication interface.

Further features of the present disclosure will become apparent from the following description of exemplary embodiments with reference to the attached drawings.

BRIEF DESCRIPTION OF THE DRAWINGS

FIGS. 9A and 9B are diagrams illustrating routing information registered in a routing table.

DESCRIPTION OF THE EMBODIMENTS

Various exemplary embodiments of the present disclosure will be described below with reference to the drawings. The exemplary embodiments discussed herein are not intended to limit the present disclosure set forth in the claims, and not all combinations of features described in the exemplary embodiments are always essential to a technical solution of the present disclosure.

Even in a case where a name resolution by a Domain Name System (DNS) server is successful and an Internet Protocol (IP) address corresponding to a hostname is obtained, a communication apparatus may fail to establish communication with a partner apparatus identified by the IP address depending on a setting in a routing table of the communication apparatus.

A specific example will be described below. For example, a communication apparatus is connected to two independent networks A and B, and a router of the network A is set as a default gateway. A partner apparatus with which the communication apparatus is to communicate is on a network C via a router of the network B. In this case, the communication apparatus attempts a name resolution of a domain name corresponding to the partner apparatus and acquires an IP address of the partner apparatus of the network C from a DNS server of the network B. However, since the router of the network A is set as the default gateway of the communication apparatus, data is transmitted to the router of the network A. As a result, the data does not reach the partner apparatus on the network C, and the communication may fail.

In the exemplary embodiments, a system that appropriately registers routing information for communicating with an external apparatus identified by an IP address acquired as a result of a name resolution in a routing table based on a route on which the name resolution has been executed will be described. Further, in the exemplary embodiments, a system that increases convenience of communication in a communication apparatus including a plurality of interfaces will be described.

Figure 1:
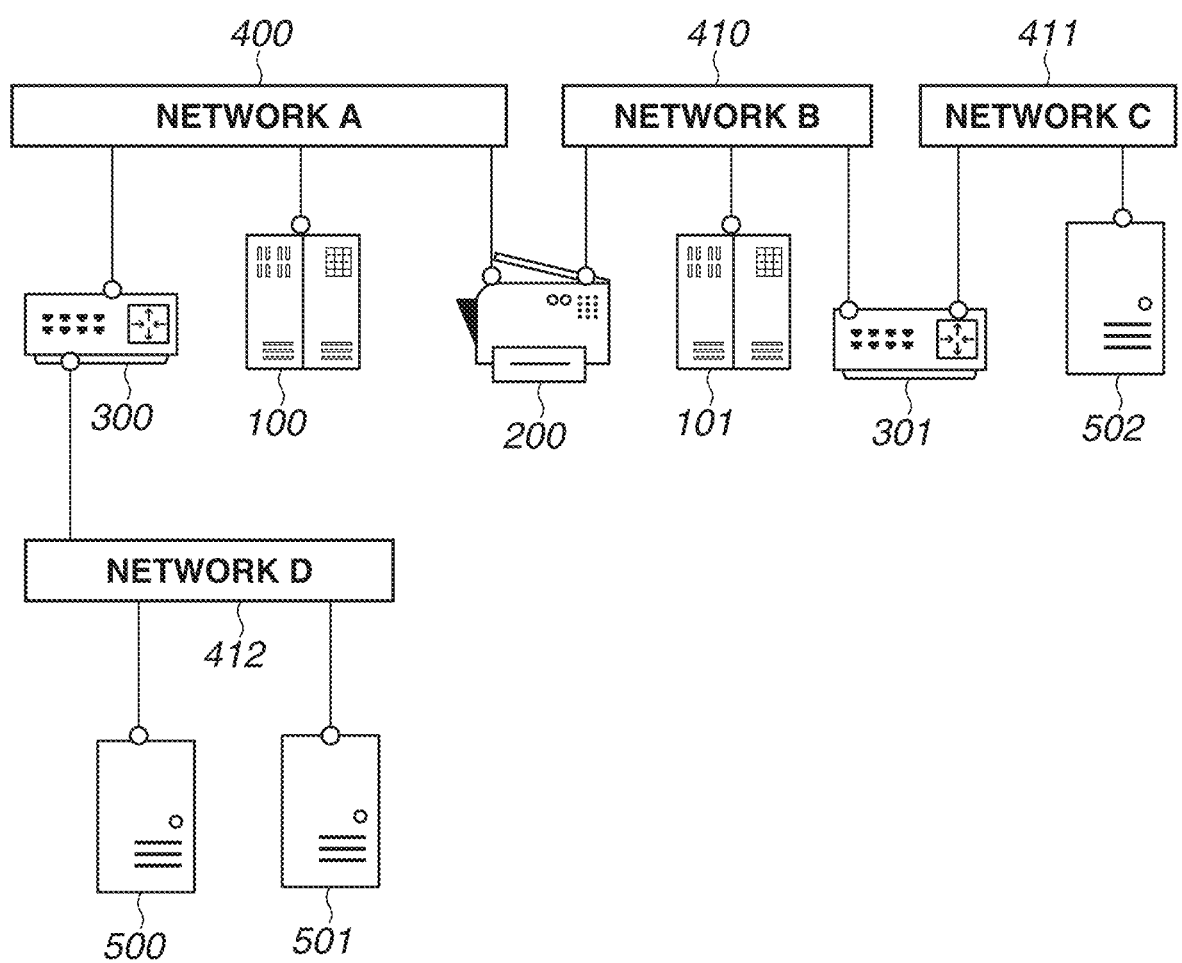
FIG. 1 is a diagram illustrating an example of a communication system.

First, a configuration of a communication system according to a first exemplary embodiment of the present disclosure will be described below with reference to FIG. 1. The communication system according to the first exemplary embodiment includes at least a multi-function peripheral (MFP) 200 and DNS servers 100 and 101. The MFP 200 includes a plurality of communication interfaces (network (NW) interfaces) and is connected to different networks A 400 and B 410.

The DNS server 100 and a router 300 are connected to the network A 400. The router 300 connects the network A 400 with a network D 412, and devices 500 and 501 are connected to the network D 412. The DNS server 101 and a router 301 are connected to the network B 410. The router 301 connects the network B 410 and a network C 411. A device 502 is connected to the network C 411.

The DNS server 100 manages a correspondence relationship between DNS names (hostnames) of devices participating in the networks A 400 and D 412 and IP addresses. In the present exemplary embodiment, DNS names of the devices 500 and 501 are managed. In contrast, the DNS server 101 manages a correspondence relationship between DNS names (hostnames) of devices participating in the networks B 410 and C 411 and IP addresses.

In the present exemplary embodiment, a case is cited where the networks A 400 and B 410 are independent different network configurations. In this case, a name resolution of the DNS name of the device 502 will not be executed if a request for the name resolution is transmitted to the DNS server 100. Similarly, a name resolution of the hostnames of the devices 500 and 501 will not be executed if a request for the name resolution is transmitted to the DNS server 101.

While the MFP 200 having a print function and a scan function is described as an example of the communication apparatus in the present exemplary embodiment, the communication apparatus to which the present exemplary embodiment is applicable is not limited to an MFP. For example, the present exemplary embodiment is also applicable to Internet of Things (IoT) devices, personal computers, edge servers, and smartphones. Each of the devices 500 to 502 may be, for example, a file server, an information management server that manages information about the MFP 200, or a server that provides a print service. Each of the devices 500 to 502, however, is not limited to such a server described herein and can be a server of a mission-critical system or a cloud server.

The MFP 200 transmits, to an external apparatus, data based on an image acquired by scanning and transmits data collected by the MFP 200. In data transmission, the MFP 200 transmits data using a destination designating the hostname of the device 501 or 502. A name resolution method used in the data transmission will be described below.

Figure 2:
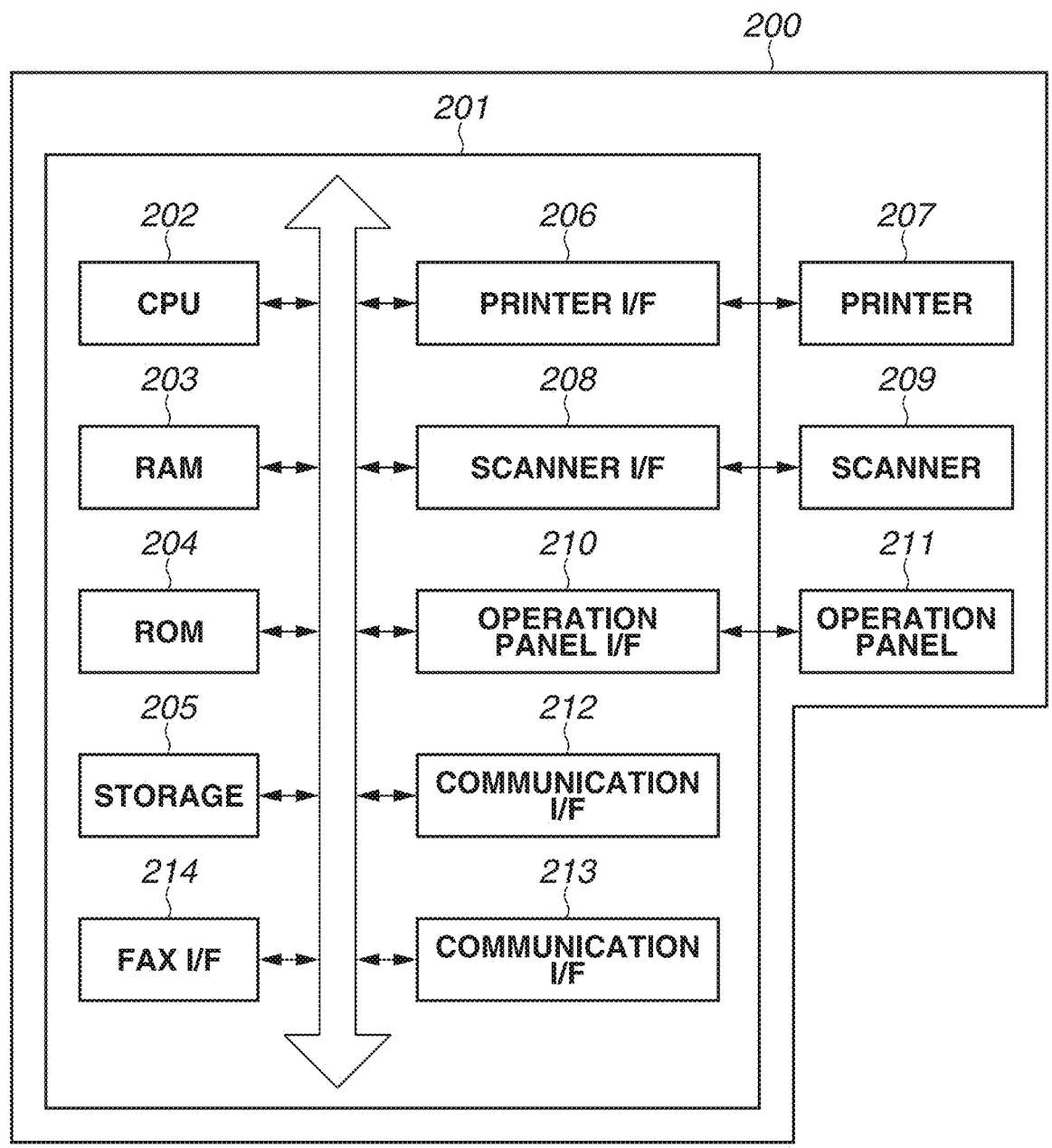
FIG. 2 is a diagram illustrating an example of a hardware configuration of a multi-function peripheral (MFP).

Next, a configuration of the MFP 200 will be described with reference to FIG. 2. FIG. 2 is a block diagram illustrating a hardware configuration of the MFP 200. The MFP 200 includes a reading function of reading an image on a sheet, and a file transmission function of transmitting the read image to an external communication apparatus. The MFP 200 further includes a print function of printing an image on a sheet.

A control unit 201 including a central processing unit (CPU) 202 controls operation of the entire MFP 200. The CPU 202 reads a control program stored in a read-only memory (ROM) 204 or a storage 205 and performs various types of control such as print control and reading control. The ROM 204 stores the control program executable by the CPU 202. A random access memory (RAM) 203 is a main storage memory of the CPU 202 and is used as a work area or as a temporary storage area for loading various control programs. The storage 205 is a non-volatile storage area for storing print data, image data, various programs, and various types of setting information. The above-described hardware components such as the CPU 202, the ROM 204, the RAM 203, and the storage 205 constitute a computer.

While the single CPU 202 executes each process illustrated in flowcharts described below using a single memory (the RAM 203) in the MFP 200 according to the present exemplary embodiment, any other forms can be employed. For example, a plurality of processors, a plurality of memories, and a plurality of storages can cooperate to execute each process illustrated in the flowcharts described below. Further, part of the processes can be executed using a hardware circuit.

A printer interface (printer I/F) 206 connects a printer 207 (printer engine) and the control unit 201. The printer 207 prints an image on a sheet fed from a sheet feeding cassette (not illustrated) based on print data input via the printer I/F 206. A printing method can be an electrophotographic method of transferring toner onto a sheet and fixing the toner to the sheet or an inkjet method of printing by discharging ink onto a sheet. Further, the printer 207 can be a three-dimensional (3D) printer that generates an output product of a 3D shape using a modeling material. In this case, print data is print data representing the 3D shape, and the output product of the 3D shape is generated using the modeling material and a support material instead of a color material such as the toner or the ink.

A scanner interface (scanner I/F) 208 connects a scanner 209 and the control unit 201. The scanner 209 reads a placed document and generates image data. The image data generated by the scanner 209 is printed by the printer 207, stored in the storage 205, and/or transmitted to an external apparatus via a facsimile interface (FAX I/F) 214 or a communication interface (communication I/F) 212 or 213. While the scanner 209 that reads a document is described as an example in the present exemplary embodiment, the scanner 209 is not limited thereto and can be a 3D scanner that reads shape data of a 3D object. In this case, the printer 207 functions as the above-described 3D printer. In a case where the scanner 209 is the 3D scanner, the shape data is generated instead of the image data. The generated shape data is transmitted to an external apparatus and is used to copy (3D copy) the 3D object by the 3D printer.

An operation panel interface (operation panel I/F) 210 connects an operation panel 211 and the control unit 201. The operation panel 211 includes a liquid crystal display unit with a touch panel function and various hardware keys and functions as a display unit that displays information and as a reception unit that receives user instructions. The CPU 202 controls information display and controls reception of user operations in cooperation with the operation panel 211.

A network cable is connected to the communication I/Fs 212 and 213, and the communication I/Fs 212 and 213 can communicate with an external apparatus via a network.

The communication I/F 212 is a first communication interface of the MFP 200 and is connected to the network A 400. The communication I/F 213 is a second communication interface of the MFP 200 and is connected to the network B 410.

In a case where the plurality of the communication I/Fs 212 and 213 of the MFP 200 according to the present exemplary embodiment is enabled, one of the communication I/Fs 212 and 213 functions as a primary network. In the present exemplary embodiment, the default gateway that transfers a packet of an unknown route is set as a setting relating to the communication I/F that functions as the primary network. In other words, the packet of the unknown route is transmitted via the communication I/F that functions as the primary network.

While a case is cited where the communication I/Fs 212 and 213 are communication interfaces that perform wired communication based on Ethernet® in the present exemplary embodiment, the communication I/Fs 212 and 213 are not limited thereto. For example, one of the communication I/Fs 212 and 213 can be a wireless communication interface based on the Institute of Electrical and Electronics Engineers (IEEE) 802.11 series. Further, both of the communication I/Fs 212 and 213 can be wireless communication interfaces. Alternatively, the communication I/Fs 212 and 213 can be communication interfaces that perform mobile communication using a third-generation (3G) network such as Code Division Multiple Access (CDMA), a fourth-generation (4G) network such as Long-Term Evolution (LTE), or a fifth-generation (5G) network.

A telephone line cable is connected to the FAX I/F 214, and thus the FAX I/F 214 is connected to a public switched telephone network (PTSN).

Next, a software configuration of the MFP 200 will be described with reference to FIG. 3. Applications 1010 are applications of the MFP 200. A transmission application 1010a is an application that communicates with an external apparatus such as the device 500 or 501 on the network D 412 or the device 502 on the network C 411. For example, the transmission application 1010a n is a transmission application that transmits data to the device via communication based on HyperText Transfer Protocol (HTTP) such as Web-based Distributed Authoring and Versioning (Web-DAV). The transmission application transmits a file based on an image acquired by reading a document with the scanner 209 to a user-designated transmission destination. The transmission destination can be designated by a user operation via a transmission setting screen (not illustrated). The user designates a destination by entering the hostname of the file server in a Fully Qualified Domain Name (FQDN) format. After the transmission destination is set via the transmission setting screen and selection of a key to start transmission is received, the transmission application 1010a transmits a request to read the document to the scanner 209. Next, the transmission application 1010a transmits data based on an image acquired by reading the document to a user-designated transmission destination. While WebDAV is described as an example of the transmission protocol in the present exemplary embodiment, the transmission protocol is not limited to WebDAV. For example, another transmission protocol such as File Transfer Protocol (FTP) or FTP over Secure Sockets Layer (SSL)/Transport Layer Security (TLS) (FTPS) can be used.

A cloud print application 1010b is an application that communicates with a specific cloud print service. The cloud print application 1010b transmits a job inquiry to the specific cloud print service (cloud server), downloads job data designated in the form of a uniform resource locator (URL) from the cloud server or a cloud storage, and prints the downloaded job data. In these types of communication, communication is performed with the destination designated by the hostname or URL.

A device management application 1010c is an application that transmits a device status to a device management server on a network. For example, operational information such as statuses of consumables (ink, toner, modeling material, and support material), a use record, and error information of a printing apparatus is transmitted to the device management server. In the above-described communication with the device management server, a name resolution of the IP address by a forward lookup from the hostname that identifies the device management server is to be performed.

An operating system (OS) 1020 includes a Transmission Control Protocol (TCP)/IP protocol stack for network communication, a DNS client 1021 for performing a name resolution, and a routing table 1022. The DNS client 1021 has a function of transmitting a name resolution request to a designated DNS server. In the present exemplary embodiment, a case where the DNS client 1021 is a standard DNS client of a Linux® system is discussed. In a case where a name resolution of the domain name is performed using the client, a DNS server is designated by writing a description such as "nameserver 'IP address of DNS server'" to a file at "/etc/resolve.conf". For redundancy, a plurality of DNS servers to be used can be designated. The DNS client 1021 has the function of transmitting the name resolution request to the designated DNS servers. However, each of the DNS servers designated herein is a DNS server for redundancy that is used as an alternative in a case where there is no response from the designated DNS server. Thus, in a case where a corresponding name is not found as a result of executing a DNS name resolution (while communication is successful), an inquiry is not transmitted to the DNS server for use as the alternative. In other words, in a case where the DNS client 1021 of the Linux® system is simply used, it is difficult to implements a DNS name resolution of each network.

Thus, in the present exemplary embodiment, the MFP 200 includes a DNS cache server 1030. The DNS client 1021 transfers a name resolution request from the applications 1010a to 1010c to the DNS cache server 1030 in the MFP 200. The DNS cache server 1030 transmits an inquiry to a plurality of DNS servers to process the name resolution transferred from the DNS client 1021. Such processing implements DNS name resolutions of a plurality of different networks.

A notification of an IP address corresponding to a hostname acquired as a result of the name resolution is transmitted to the application that has made the request via the DNS client 1021. The application communicates with the external apparatus identified by the IP address in cooperation with the OS 1020.

The OS 1020 determines a communication route based on the destination IP address and the routing table 1022.

Routing information defining which network interface is to be used and to which relay destination (gateway) data is to be transmitted is registered for each destination IP address in the routing table 1022. Routing information for transmitting data to the default gateway in a case where no match is found among the registered routes is also registered. Specific routing information will be described below.

Next, the OS 1020 identifies a communication I/F to be used in data transmission based on the determined routing information. Then, the OS 1020 transmits packet data to the destination IP address via the identified communication I/F.

Meanwhile, even in a case where a name resolution by a DNS server is successful and an IP address corresponding to a hostname is obtained, the MFP 200 may fail to establish communication with a partner apparatus identified by the IP address depending on a setting in the routing table 1022.

A specific example will be described below. A case is cited where the partner apparatus with which the MFP 200 is to communicate is the device 502 on the network C 411 via the router 301 of the network B 410. Further, in the MFP 200, the communication I/F 212 functions as the primary network, and the router 300 of the network A 400 is set as the default gateway.

In this case, the DNS client 1021 and the DNS cache server 1030 of the MFP 200 cooperate and attempt a name resolution of the hostname of the device 502, and the IP address of the device 502 is acquired from the DNS server 101 on the network B 410.

However, unless static routing information corresponding to the IP address is pre-registered in the routing table 1022 by an administrator, a route for transferring a packet to the default gateway is selected in a communication route determination process executed by the OS 1020. Specifically, the OS 1020 transmits the packet from the communication I/F 212 so that the packet is transmitted externally via the router 300 of the network A 400. Consequently, the packet cannot reach the device 502 on the network C 411, and the communication may fail.

In response to at least one of the above-described issues, the present exemplary embodiment provides a system for registering routing information to perform communication via a communication I/F for which a default gateway is not set in a case where an IP address is acquired using a DNS server of the communication I/F. This will be described in detail below.

Figure 3:
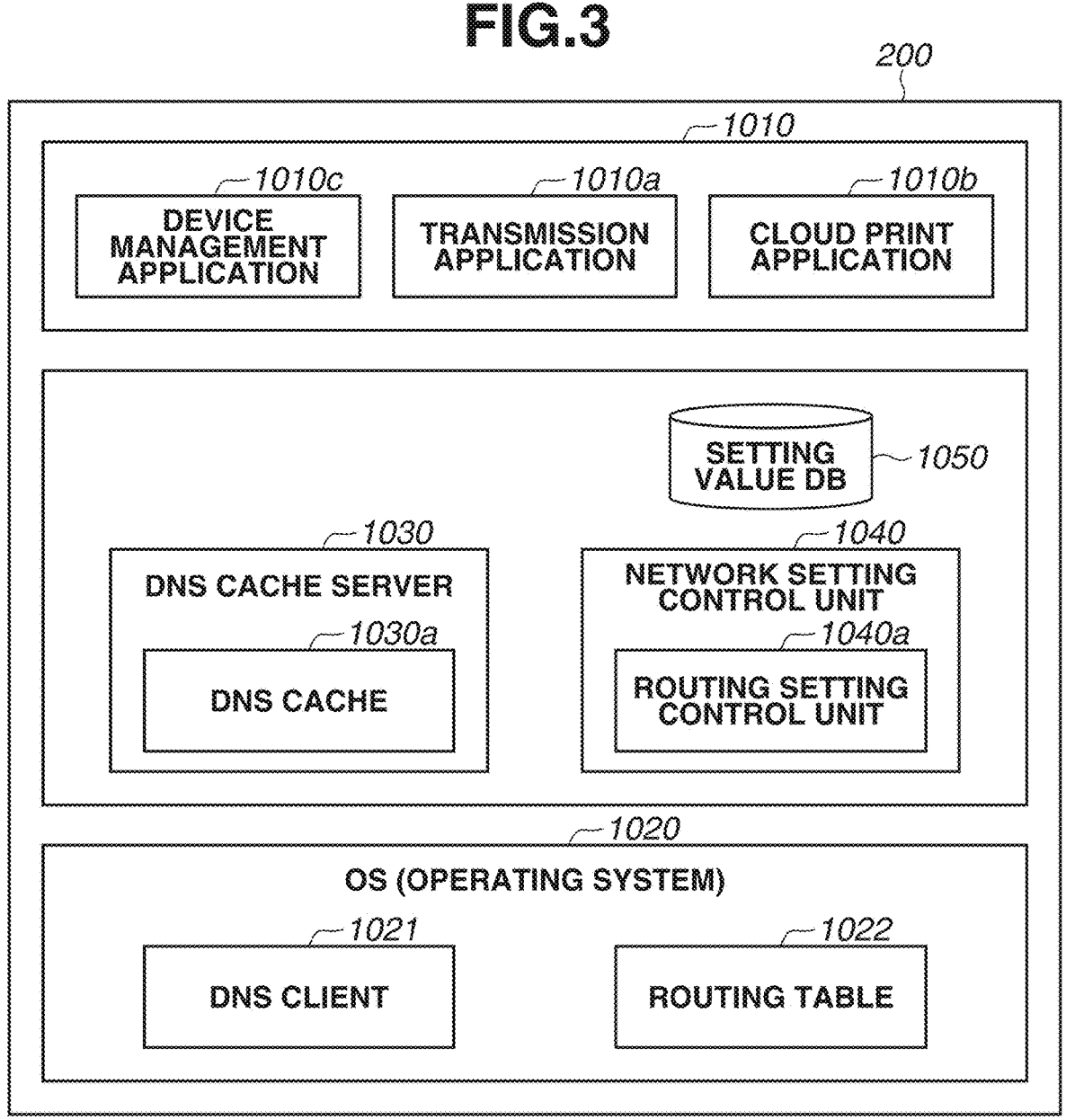
FIG. 3 is a diagram illustrating an example of a software configuration of the MFP.

Referring back to description of FIG. 3, a setting value database (setting value DB) 1050 stores operation settings of the MFP 200 including communication I/F settings. The communication I/F settings include setting information about whether each communication I/F is enabled or disabled, static routing setting information, and static routing registration information. Settings of IP addresses assigned to the interfaces and of network addresses are also included. In addition, settings of an address of a DNS server for each communication I/F and of a gateway for using each communication I/F are also included. The setting value DB 1050 is referred to as needed in a control process of registering routing information in the routing table 1022 and in control processes illustrated in the flowcharts.

Further, a network setting control unit 1040 includes a function of displaying a setting screen on the operation panel 211, receiving a change to various network settings from the user such as the administrator, and storing the change in the setting value DB 1050. Further, the network setting control unit 1040 includes a routing setting control unit 1040a. The routing setting control unit 1040a refers to values in the setting value DB 1050 and adds and erases a setting to or from the routing table 1022. The network setting control unit 1040 can provide a web page for checking and changing the network settings in cooperation with a web server function (not illustrated). In this case, the user such as the administrator can access the web page provided by the MFP 200 from a client such as a personal computer (PC) and can change the network settings via the web page.

An example of the network settings in the present exemplary embodiment will be described below. In the present exemplary embodiment, a case where the communication I/Fs 212 and 213 are both enabled and the communication I/F 212 is set to function as the primary network will be described below.

The other interfaces that do not function as the primary network each function as a sub-network that communicates with a communication apparatus on the same network and communicates with a communication apparatus for which a static route is preset to the interface. In the present exemplary embodiment, a difference between the communication I/F that functions as the default gateway and the communication I/F that functions as the sub-network lies in configurability as the default gateway. However, the difference is not limited thereto. The function of the communication I/F that functions as the sub-network can be limited compared to that of the communication I/F that functions as the primary network. For example, use of protocols can partly be limited.

Hereinafter, for a description purpose, a case where a network A corresponding to the communication I/F 212 functions as the primary network and a network B corresponding to the communication I/F 213 functions as the sub-network that is lower in priority than the primary network will be described below. Hereinafter, the communication I/F 212 will be referred to simply as the network A and the communication I/F 213 as the network B. Further, the sub-network is referred to as a secondary network.

The routing setting control unit 1040a registers, in the routing table 1022, routing information for communicating with an external apparatus on the network of the communication I/F 212 from the communication I/F 212 based on the information stored in the setting DB 1050. Further, the routing setting control unit 1040a registers routing information for communicating with an external apparatus of the network of the communication I/F 213 from the communication I/F 213 in the routing table 1022. For other destinations with unknown routes, routing information for transferring data from the communication I/F 212 that functions as the primary network to the default gateway is registered in the routing table 1022.

Figure 8:
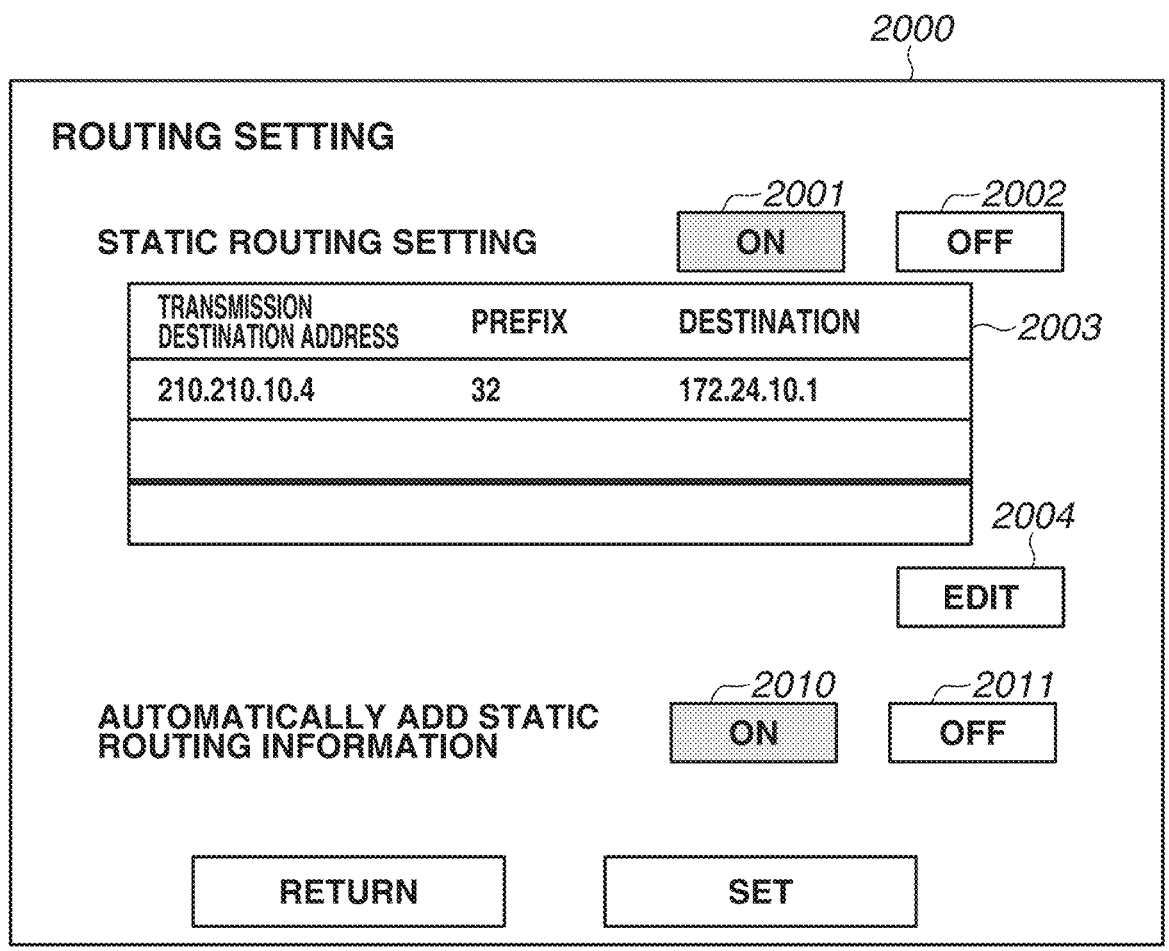
FIG. 8 is a diagram illustrating an example of a network-related setting screen.

The network settings will be described below with reference to FIG. 8. FIG. 8 illustrates an example of a setting screen displayed on the operation panel 211 by the network setting control unit 1040 and illustrates a static route setting screen 2000 for registering routing information to be registered in the routing table 1022.

The user such as the administrator can register static routing information to be reflected in the routing table 1022 via the setting screen 2000. Keys 2001 and 2002 are display items for enabling and disabling the static routing. One of the keys 2001 and 2002 is enabled while the other is disabled. In the present exemplary embodiment, a case where the key 2001 is enabled is described as an example.

In the present exemplary embodiment, the term display item is a collective term for display objects such as keys and buttons for receiving user operations, labels for displaying information, display regions, and drawn objects. While a case where the setting screen is displayed on the operation panel 211 will be described below as an example, the settings can be set similarly by accessing the web page provided by the MFP 200 from a web browser of a client terminal.

A region 2003 is a region that displays a static routing setting that has been set. As the static routing setting, a transmission destination address and a prefix are set as routing conditions, and information about a gateway to be a transmission destination in a case where the address matches is displayed. The user can edit the static routing setting by selecting an edit key 2004. In a case where the MFP 200 detects that the edit key 2004 is selected, the MFP 200 displays a software keyboard (not illustrated) and an edit screen (not illustrated) on the operation panel 211. The user can enter information about a transmission destination address, a prefix, and a gateway using the edit screen and the software keyboard.

FIGS. 9A and 9B are diagrams illustrating routing information registered in the routing table 1022. FIG. 9A illustrates an example of the routing table 1022 reflecting the static routing settings illustrated as an example on the setting screen 2000. An eth1 is a logical interface corresponding to the communication I/F 212, and an eth2 is a logical interface corresponding to the communication I/F 213. Further, in the illustrated example case, the network address of the network of the eth1 is 192.168.250.0, and the network address of the network of the eth2 is 172.24.10.0. The router 300 that is communicable via the communication I/F 212 is set as the default gateway. In the illustrated example case, the IP address of the router 300 is 192.168.250.2, and the IP address of the router 301 is 172.24.10.1. In the illustrated case, the settings displayed as an example on the setting screen 2000 are set as the static routing settings, and a static route based on the settings is registered.

Routing information 901 specifies a default route indicating a transmission destination of a packet that is not specified by the other routing information in the routing table 1022. The routing information 901 indicates that a packet to be transmitted to a destination that does not match any of routing information 902 to routing information 904 is to be transferred to the router 300 (192.168.250.2), which is the default gateway.

The routing information 902 is routing information for controlling communication with an external apparatus on the network of the eth1 (the communication I/F 212) so that the communication is performed from the eth1 (the communication I/F 212). The routing information 903 is routing information for controlling communication with an external apparatus on the network of the eth2 (the communication I/F 213) so that the communication is performed from the eth2 (the communication I/F 213). The routing information 904 is routing information registered based on the static routing information registered via the setting screen 2000. Specifically, the routing information 904 specifies a transfer condition that a packet to a destination at the destination IP address 210.210.10.4 is transferred to the router 301 (172.24.10.1) using the eth2 (the communication I/F 213).

Referring back to description of FIG. 8, keys 2010 and 2011 are display items for enabling and disabling a static routing automatic registration setting. One of the keys 2010 and 2011 is enabled while the other is disabled. In the present exemplary embodiment, a case where the key 2010 is enabled is described as an example.

The setting of enabling or disabling static routing automatic registration that is set via the setting screen 2000 and the static routing information entered in the region 2003 illustrated in FIG. 8 are stored in the setting value DB 1050. In a case where the static routing automatic registration setting is enabled, the MFP 200 controls automatic addition of the static routing information.

A specific process of the control will be described with reference to FIG. 4. The letter S that stands for a step is added at the beginning of a number indicating each process. The CPU 202 reads a program for implementing each control module stored in the ROM 204 or the storage 205, loads the program into the RAM 203, and executes the program to thereby implement each operation (step) illustrated in flowcharts in FIGS. 4 to 6. A process of data transmission and reception, for example, is implemented in cooperation with the communication I/Fs 212 and 213. In a case where a subject that performs a step is to be specified, a software module executed by the CPU 202 will be described as the subject in the description of the process.

Figure 4:
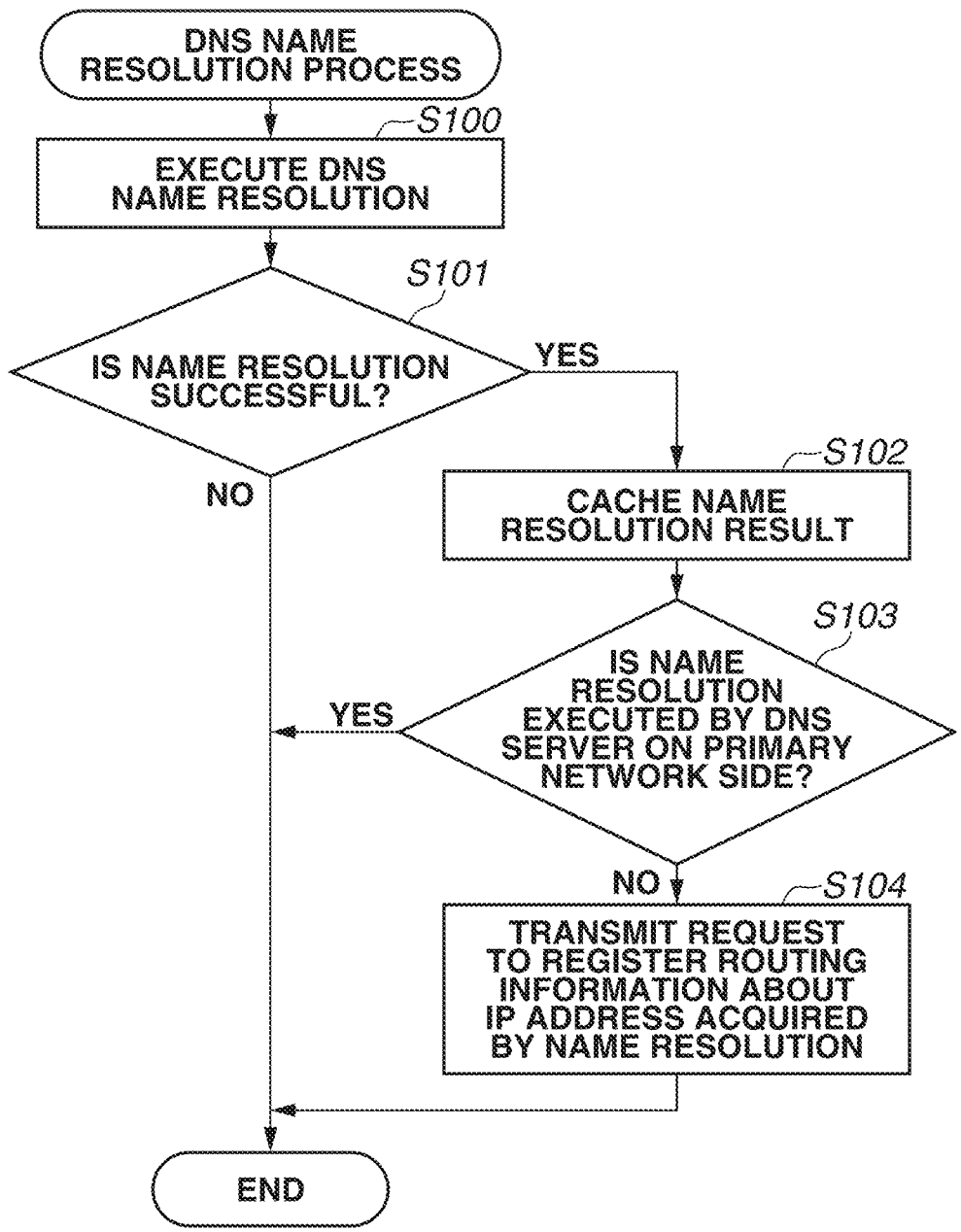
FIG. 4 is a flowchart illustrating an example of a control process of the MFP.

The flowchart in FIG. 4 is started in response to reception of a name resolution request from the application 1010a, 1010b, or 1010c and the DNS client 1021 by the DNS cache server 1030.

In step S100, the DNS cache server 1030 having received the DNS name resolution request attempts a DNS name resolution. Specifically, the DNS cache server 1030 transmits a name resolution request to DNS servers corresponding to the communication I/Fs stored in the setting value DB 1050.

Next, in step S101, the DNS cache server 1030 determines whether the name resolution is successful. In a case where there is not a response from any of the DNS servers or in a case where all the DNS servers fail to retrieve an IP address by a forward lookup, the DNS cache server 1030 determines that the name resolution has failed. In a case where the IP address of the hostname is retrieved by a forward lookup from one or more of the DNS servers, the DNS cache server 1030 determines that the name resolution is successful. In the case where the DNS cache server 1030 determines that the name resolution is successful (YES in step S101), the processing proceeds to step S102. In the case where the DNS cache server 1030 determines that the name resolution has failed (NO in step S101), an error notification is transmitted to the DNS client 1021, and the processing ends.

In step S102, the DNS cache server 1030 stores DNS cache information indicating a name resolution result in a DNS cache 1030a. The cache time that is an expiration date is set for the DNS cache. The DNS cache server 1030 sets a Time to Live (TTL) value contained in a DNS name resolution response as the cache time of the DNS cache information. Thereafter, the DNS cache server 1030 having received the request further determines whether there is corresponding DNS cache information in the DNS cache 1030a. As a result of the determination, in a case where there is the corresponding DNS cache information, a response with the name resolution result is transmitted to the DNS client 1021 using the DNS cache information without transmitting an inquiry to an external DNS server. On the other hand, in a case where there is not the corresponding cache information, an inquiry is transmitted to the external DNS server as described in step S100.

Next, in step S103, the DNS cache server 1030 determines whether the DNS server by which the forward lookup for the IP address is executed is the DNS server associated with the communication I/F 212 that functions as the primary network. In a case where the forward lookup is executed by the DNS server associated with the communication I/F 212 that functions as the primary network (YES in step S103), the processing ends without registering routing information. On the other hand, in a case where the forward lookup is not executed by the DNS server associated with the communication I/F 212 that functions as the primary network (NO in step S103), the processing proceeds to step S104.

In step S104, the DNS cache server 1030 transmits a request, to the routing setting control unit 1040a, to register routing information for communicating a packet to be transmitted to the IP address acquired as a result of the name resolution via the communication I/F associated with the DNS server by which the forward lookup is executed. If the request is completed, the name resolution processing ends. The request contains the IP address and information for identifying the communication I/F that is to be used in the name resolution of the IP address.

Figure 5:
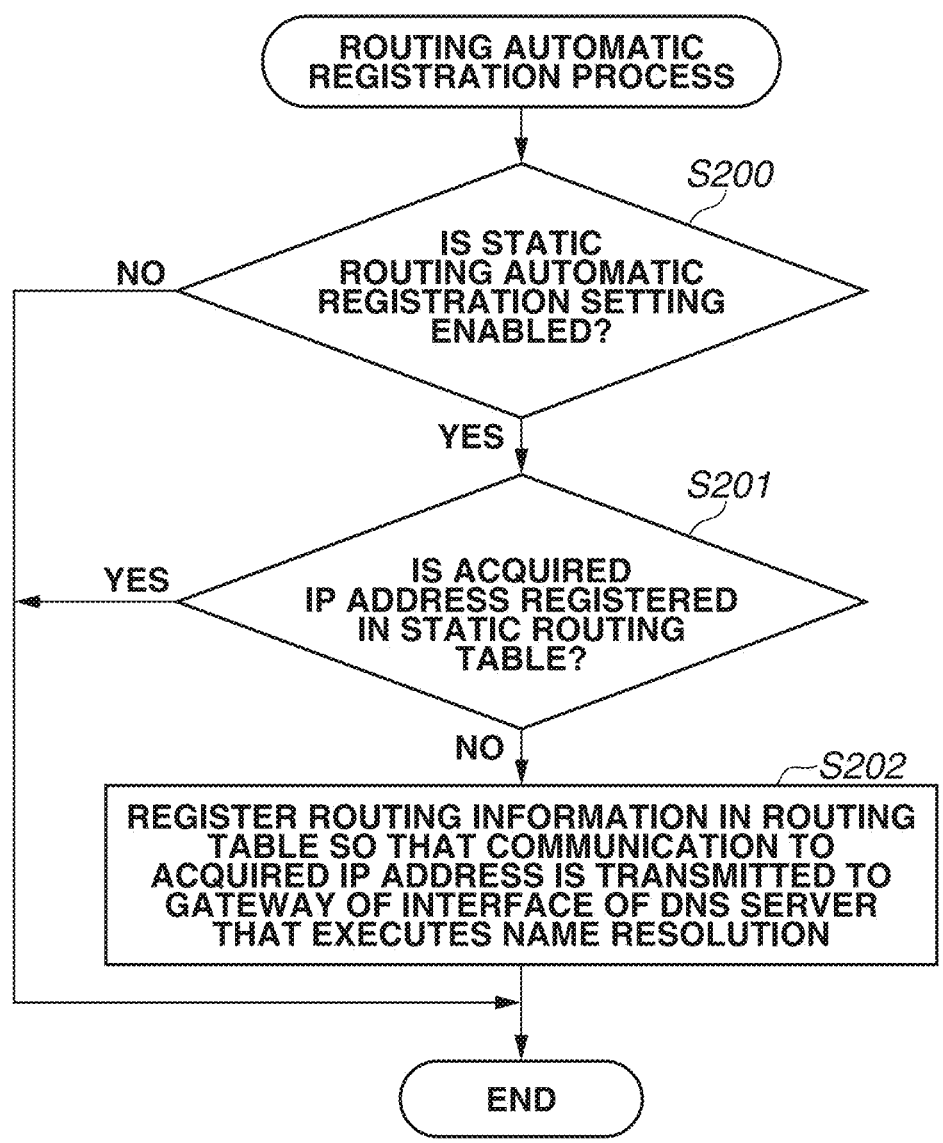
FIG. 5 is a flowchart illustrating an example of a control process of the MFP.

Next, the routing automatic registration process by the routing setting control unit 1040a will be described with reference to the flowchart illustrated in FIG. 5. Each process illustrated in FIG. 5 is executed in response to reception of the request in step S104 by the routing setting control unit 1040a.

In step S200, the routing setting control unit 1040a refers to the setting value DB 1050 and determines whether the static routing automatic registration setting is enabled. In a case where the static routing automatic registration setting is enabled (YES in step S200), the processing proceeds to step S201. In a case where the static routing automatic registration setting is not enabled (i.e., disabled) (NO in step S200), the processing ends without executing a registration process based on the request.

In step S201, the routing setting control unit 1040a determines whether the IP address contained in the request is registered in the routing table 1022. In a case where the routing setting control unit 1040a determines that the IP address contained in the request is registered in the routing table 1022 (YES in step S201), the processing ends. On the other hand, in a case where the routing setting control unit 1040a determines that the IP address contained in the request is not registered in the routing table 1022 (NO in step S201), the processing proceeds to step S202.

In step S202, the routing setting control unit 1040a registers the routing information for transferring the packet that is to be transmitted to the IP address acquired by the name resolution to the gateway set to the interface of the DNS server by which the name resolution is executed in the routing table 1022, and the processing ends. Further, the routing setting control unit 1040a stores the registered routing information as automatically-registered static routing information in the setting value DB 1050. The information is managed separately from the static routing information registered manually via the setting screen 2000.

By the processes described above with reference to FIGS. 4 and 5, in a case where the name resolution of the partner apparatus is executed via a secondary interface, routing information for executing IP communication with the partner apparatus via the interface via which the name resolution is executed is set as appropriate. Thus, the communication can be appropriately performed.

A specific example will be described with reference to FIG. 9B. FIG. 9B illustrates the routing table 1022 after the routing settings are automatically registered by the processes in FIGS. 4 and 5. FIG. 9B illustrates an automatic registration result in a case where the DNS server corresponding to the eth2 (the communication I/F 213) performs a forward lookup for the hostname and the IP address 210.210.20.20 of the device 502 on the network C is acquired.

In this case, the request transmitted in step S104 contains the IP address information 210.210.20.20 and information eth2 for identifying the communication I/F that is to be used in the name resolution of the IP address. The routing setting control unit 1040a having received the request automatically registers routing information 905 in the routing table 1022 based on the request.

Figure 6:
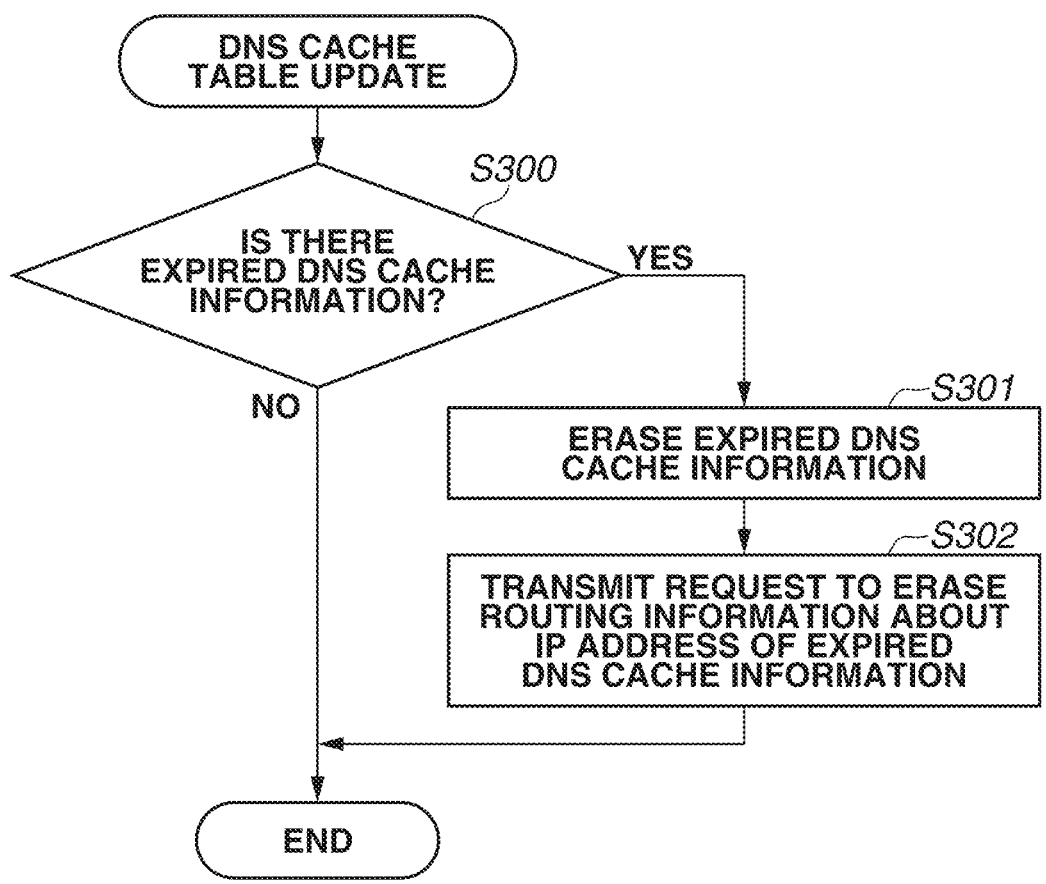
FIG. 6 is a flowchart illustrating an example of a control process of the MFP.
Figure 7:
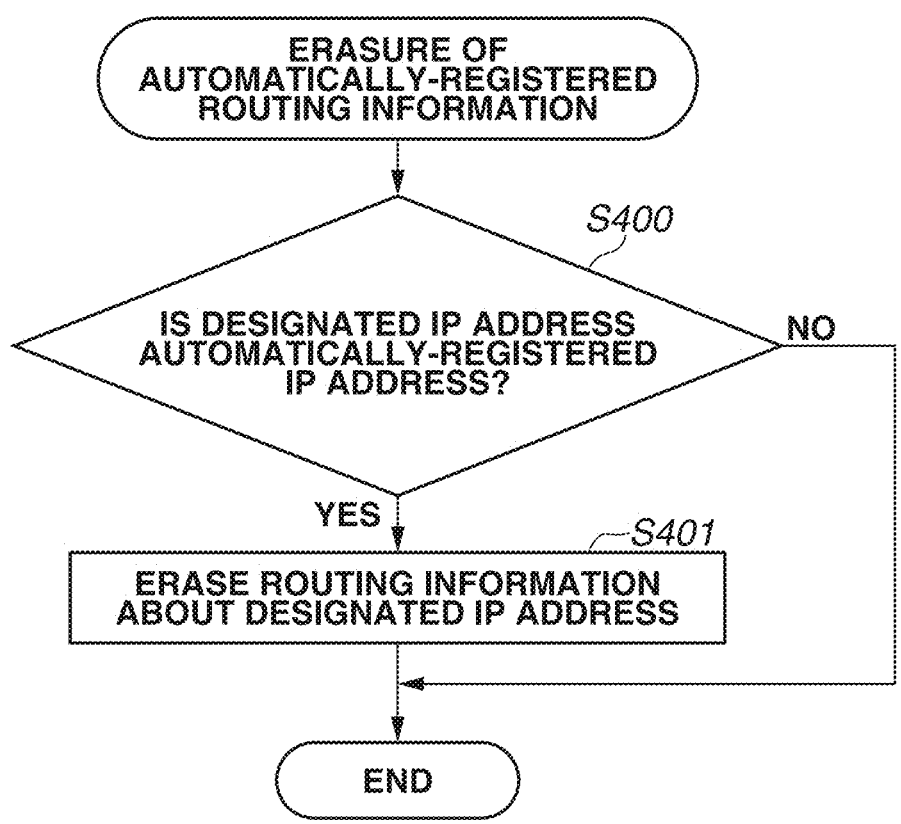
FIG. 7 is a flowchart illustrating an example of a control process of the MFP.

Lastly, a control process for erasing the automatically-registered routing information will be described. As time passes, a network configuration or an IP address of an external apparatus may change. Further, in a case where an external apparatus is managed using a dynamic DNS (DDNS) technique, the IP address may vary over time. In this case, if the routing information automatically registered in FIGS. 4 and 5 is continuously used, unintended communication may occur. Thus, the present exemplary embodiment provides a system of erasing the automatically-registered routing information as illustrated in FIGS. 6 and 7. Specifically, the registered routing setting is erased in synchronization with expiration of the DNS cache information in the DNS cache server 1030.

FIG. 6 is a flowchart illustrating a control process of erasing a cache of the DNS cache server 1030. The flowchart is periodically read and executed by the MFP 200.

In step S300, the DNS cache server 1030 refers to the DNS cache 1030a and determines whether there is expired DNS cache information. In a case where there is the expired DNS cache information (YES in step S300), the processing proceeds to step S301. In a case where there is no expired DNS cache information (NO in step S300), the processing ends.

Next, in step S301, the DNS cache server 1030 erases the expired DNS cache information. In step S302, the DNS cache server 1030 transmits a request to erase the routing information about the IP address corresponding to the DNS cache information erased in step S301 to the routing setting control unit 1040a. The request to erase also contains a request to erase information about the IP address corresponding to the DNS cache information erased in step S301.

FIG. 7 is a flowchart illustrating a process of erasing automatically-registered routing information by the routing setting control unit 1040a. Each process illustrated in the flowchart in FIG. 7 is executed in response to reception of the request to erase from the DNS cache server 1030.

In step S400, the routing setting control unit 1040a refers to the automatically-registered static routing information stored in the setting value DB 1050 and determines whether the IP address for which the request to erase is issued is an IP address automatically registered in a static routing table. In a case where the routing setting control unit 1040a determines that the IP address for which the request to erase is issued is the IP address automatically registered in the static routing table (YES in step S400), the processing proceeds to step S401. On the other hand, in a case where the routing setting control unit 1040a determines that the IP address for which the request to erase is issued is not the IP address automatically registered in the static routing table (NO in step S400), the processing ends.

In step S401, the routing setting control unit 1040a erases the IP address for which the request to erase is issued from the automatically-registered static routing information in the setting value DB 1050. Then, the routing setting control unit 1040a transmits, to the OS 1020, a request to erase the routing information about the IP address for which the request to erase is issued from the routing table 1022. The OS 1020 updates the routing table 1022 based on the request. If the updating ends, the processing ends.

In the first exemplary embodiment, the case where the DNS cache server 1030 transmits a name resolution inquiry to both of the DNS servers 100 and 101 corresponding to the communication I/Fs 212 and 213 is described as an example. However, in a case where different communication I/Fs are used to physically separate the networks, it may be undesirable to transmit information about one of the networks to the other network. Specifically, in a case where data to be transmitted to a network is to be separated reliably from data to be transmitted to another network, a leakage of information about a hostname of the network to the other network may not be allowed.

A second exemplary embodiment focuses on the point that a transfer condition for transmitting a recursive inquiry to another DNS server can be registered in the DNS cache server 1030. A system that defines a network that is an inquiry destination of a DNS server using the transfer condition and transmits an inquiry to the single DNS server based on the transfer condition will be described below.

Figure 10:
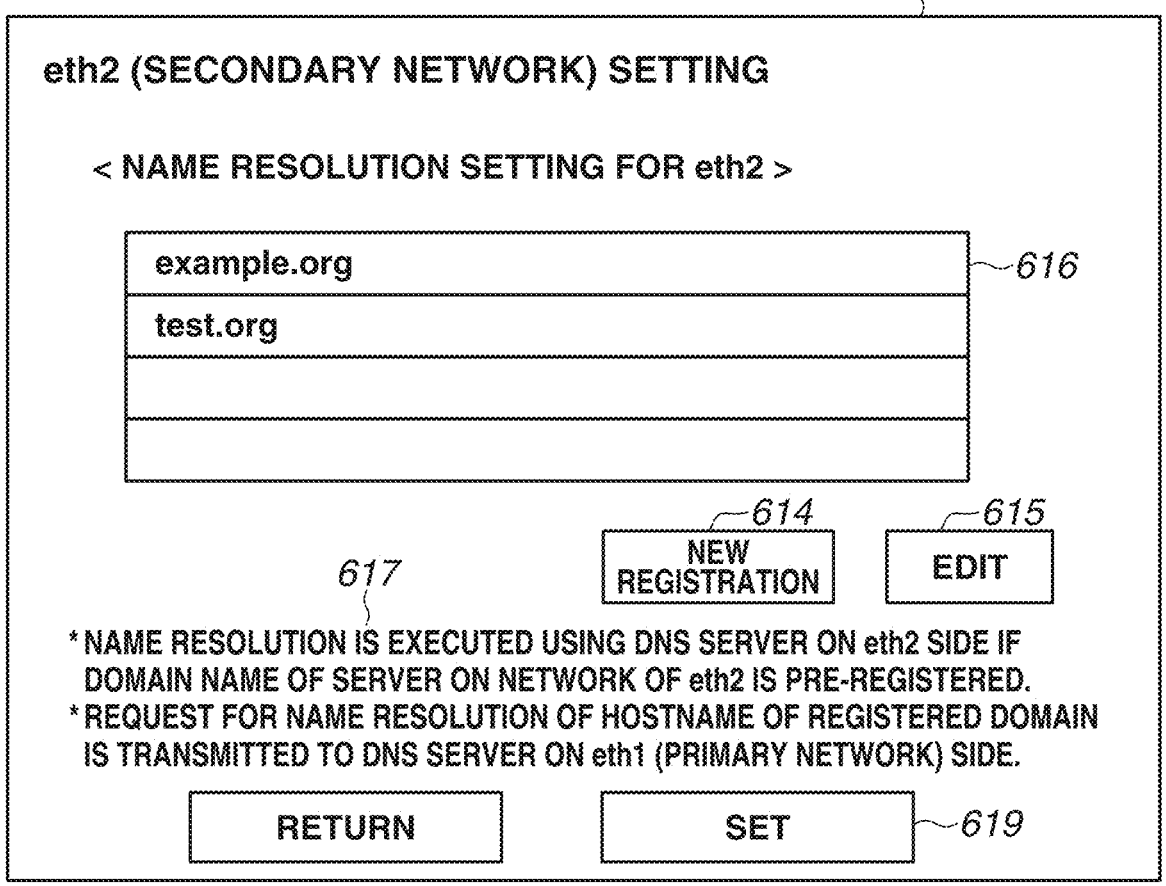
FIG. 10 illustrates an example of a setting screen according to a second exemplary embodiment.

FIG. 10 illustrates an example of a setting screen displayed on an operation panel 211 according to the second exemplary embodiment.

A setting screen 610 is a setting screen for receiving settings relating to the communication I/F 213 that functions as the secondary network (sub-network). The user can make a setting to register a domain name for which a name resolution request is to be transmitted to the DNS server on the eth2 (the communication I/F 212) side via the setting screen 610. A region 616 is a display item that presents registered domain names to the user. The user can select one line corresponding to a registered domain name by a touch operation on the region 616.

A new registration key 614 is a display item that is used to register a new domain name for which a name resolution request is to be transmitted to the DNS server on the eth2 side. An edit key 615 is a display item that is used to edit the registered domain name selected by the touch operation on the region 616. A message 617 is a display item that describes the function to the user. Specifically, the message 617 contains a message notifying the user that a name resolution is executed using the DNS server on the eth2 side if a domain name of a server on the network of the eth2 is pre-registered. The message 617 further contains a warning message indicating that a request for a name resolution of a hostname managed by a domain that is pre-registered is transmitted to the DNS server on the eth1 (primary network) side. The message 617 is displayed so that the user can intuitively understand for what purpose the function is provided and a consequence of not making the setting. A set key 619 is a key that is used to apply the settings made via the setting screen 610 to the setting value DB 1050. A return key is a key that is used to discard the settings made via the setting screen 610 and to end the setting.

In a case where selection of the new registration key 614 is detected, the network setting control unit 1040 displays a setting screen containing a textbox for receiving entry of a domain name. The user enters a domain name in the textbox and registers the domain name via the setting screen. If the registration operation is detected, the network setting control unit 1040 updates a domain list stored in the setting value DB 1050. The domain list is a list of domains for which a name resolution request is to be transmitted to the DNS server on the eth2 side. The updated domain list is referred to as needed in the flowchart in FIG. 11. The domain list is used in determining the transfer condition for determining to which DNS server an inquiry is to be transmitted.

Figure 11:
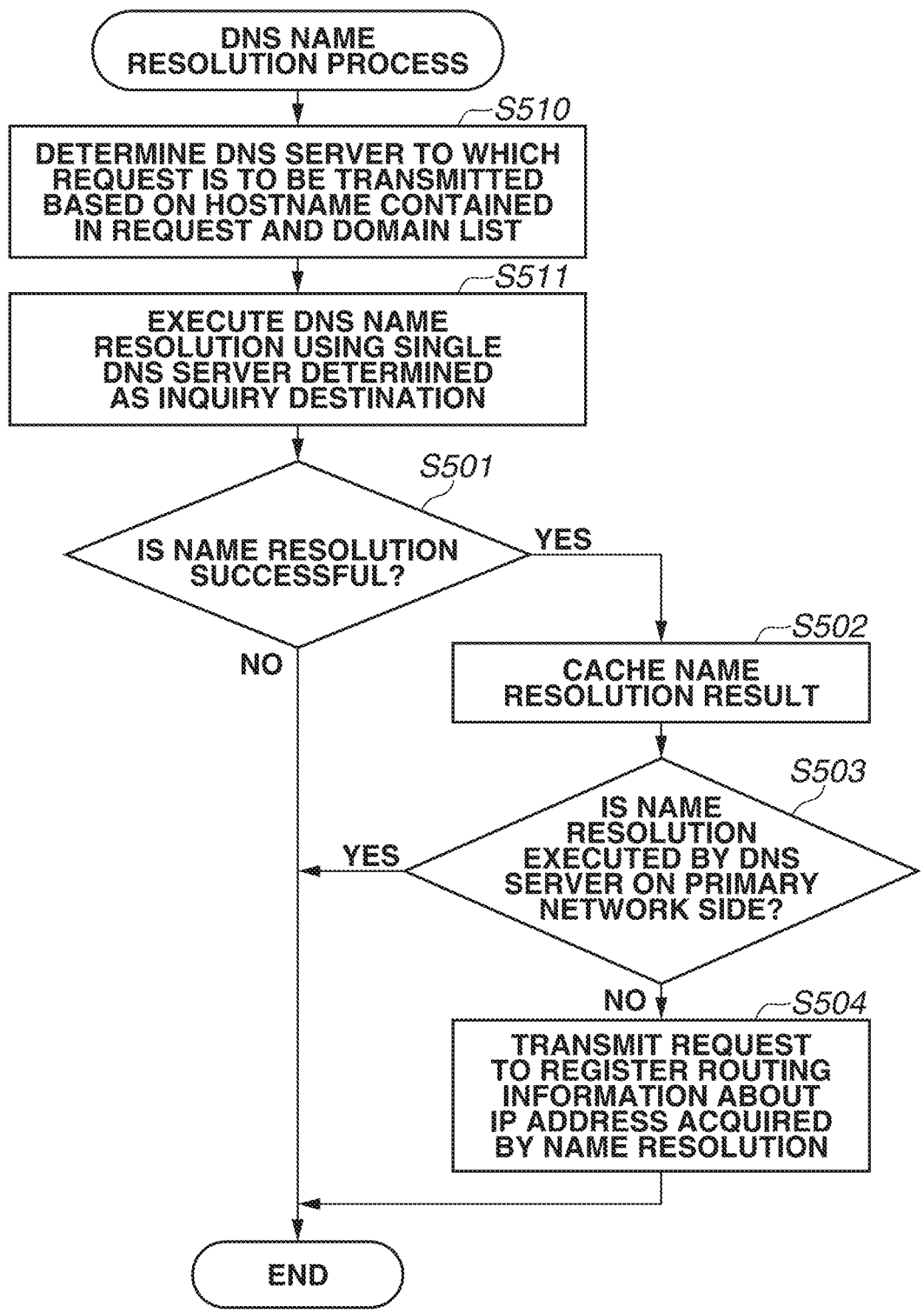
FIG. 11 is a diagram illustrating an example of a control process of the MFP according to a second exemplary embodiment.

FIG. 11 is a flowchart illustrating a control process by the DNS cache server 1030 according to the second exemplary embodiment. The flowchart in FIG. 11 illustrates a process that is executed in place of the process illustrated in the flowchart in FIG. 4 according to the first exemplary embodiment.

In step S510, the DNS cache server 1030 refers to the setting value DB 1050 and acquires the domain list. Then, the DNS cache server 1030 determines a DNS server to which a name resolution request is to be transmitted based on a hostname contained in the name resolution request and the domain list. Specifically, in a case where the hostname corresponding to the name resolution request is registered in the domain list, the DNS cache server 1030 determines to transmit the inquiry to the DNS server on the communication I/F side that functions as the secondary network. On the other hand, in a case where the hostname corresponding to the name resolution request is not registered in the domain list, the DNS cache server 1030 determines to transmit the inquiry to the DNS server on the communication I/F side that functions as the primary network.

In step S511, the DNS cache server 1030 transmits the name resolution request to the single DNS server determined as the inquiry destination and executes the name resolution process. Subsequent steps S501, S502, S503, and S504 are similar to steps S101, S102, S103, and S104 in the first exemplary embodiment, so that redundant descriptions thereof are omitted. Further, a static route registration process and an erasing process are also similar to those in the first exemplary embodiment, so that redundant descriptions thereof are omitted.

With each system according to the above-described exemplary embodiments, routing information for communicating with an external apparatus identified by an IP address acquired as a result of a name resolution is registered as appropriate in a routing table. Furthermore, with each system according to the above-described exemplary embodiments, communication by a communication apparatus including a plurality of interfaces becomes more convenient.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-104675, filed Jun. 17, 2020, which is hereby incorporated by reference herein in its entirety.

What is claimed is:

1. A method of controlling a communication apparatus to transmit data externally via a plurality of different communication interfaces, the method comprising:

transmitting a request for a name resolution of a hostname to at least a first Domain Name System (DNS) server located on a first network and a second DNS server located on a second network different from the first network in a case where a request for the name resolution of the hostname is received from an application of the communication apparatus, and controlling whether to register, in a routing table, routing information for communicating with an external apparatus identified by an Internet Protocol (IP) address acquired as a result of the name resolution of the hostname, based on whether a DNS server that successfully executed the name resolution of the hostname in response to the transmitted request is the first DNS server associated with a first communication interface to which a default gateway is set, wherein, in a case where the DNS server that successfully executed the name resolution of the hostname is not the first DNS server, and is the second DNS server, controlling includes performing control to register, in the routing table, a routing information for communicating with the external apparatus located on a third network, different from the first network and the second network, via a second communication interface associated with the second network, and wherein, in a case where the DNS server that successfully executed the name resolution of the hostname is the first DNS server, controlling includes performing control not to register, in the routing table, a routing information for communicating with the external apparatus.

2. The method according to claim 1, wherein the external apparatus is a first external apparatus, the method further comprising:

receiving a user operation of registering a correspondence relationship between the hostname and a communication interface to be used in a communication with a second external apparatus identified by the hostname; and transmitting the request for the name resolution of the hostname to a DNS server associated with the communication interface to be used based on the received user operation of registering the correspondence relationship, wherein, in a case where the name resolution of the hostname for which the request is transmitted to the DNS server associated with the communication interface is successfully executed, registering the correspondence relationship includes registering, in the routing table, the routing information for communicating with the external apparatus.

3. The method according to claim 1, further comprising reading a document by a reading unit.

4. The method according to claim 3, further comprising:
transmitting, to an external apparatus via a transmission application of the communication apparatus, an image acquired by the reading unit reading the document; and
determining a communication interface to be used in a communication based on the routing information registered in the routing table in a case where the image is designated as a transmission destination to be used in the transmission application and communication with the external apparatus identified by the IP address acquired as the result of the name resolution of the hostname is to be performed.

5. The method according to claim 1, further comprising:
caching, as cache, the result of the name resolution of the hostname in a storage;
erasing the result of the name resolution of the hostname having reached an expiration date of the cache; and
erasing the routing information from the routing table in a case where the IP address acquired as the result of the name resolution of the hostname is registered as the routing information in the routing table at a time of erasing the result of the name resolution of the hostname.

6. The method according to claim 1, wherein registering includes registering the routing information in the routing table as static routing information in the routing table.

7. The method according to claim 1, further comprising determining, in a case where the name resolution of the hostname in response to the request transmitted by the transmission unit is successfully executed, whether a DNS server that successfully executed the name resolution of the hostname is the first DNS server.

8. The method according to claim 1, wherein, in a case where the DNS server that successfully executed the name resolution of the hostname is not the first DNS server, controlling includes performing control so that the routing information to be registered in the routing table is information indicating that a communication interface used for the name resolution of the DNS server that successfully executed the name resolution of the hostname is to be used.

9. The method according to claim 1, wherein the second network and the third network are connected to each other.

10. The method according to claim 9, wherein the first network and the third network are not connected to each other.

11. The method according to claim 9, wherein the first communication interface is connected to the first network, and the second communication interface is connected to the second network.

12. A communication apparatus to transmit data externally via a plurality of different communication interfaces, the communication apparatus comprising:

at least one memory and at least one processor which functions as:

a transmission unit configured to transmit a request for a name resolution of a hostname to at least a first Domain Name System (DNS) server located on a first network and a second DNS server located on a second network different from the first network in a case where a request for the name resolution of the hostname is received from an application of the communication apparatus, and a registration unit configured to control whether to register, in a routing table, routing information for communicating with an external apparatus identified by an Internet Protocol (IP) address acquired as a result of the name resolution of the hostname, based on whether a DNS server that successfully executed the name resolution of the hostname in response to the request transmitted by the transmission unit is the first DNS server associated with a first communication interface to which a default gateway is set, wherein, in a case where the DNS server that successfully executed the name resolution of the hostname is not the first DNS server, and is the second DNS server, the registration unit performs control to register, in the routing table, a routing information for communicating with the external apparatus located on a third network, different from the first network and the second network, via a second communication interface associated with the second network, and wherein, in a case where the DNS server that successfully executed the name resolution of the hostname is the first DNS server, the registration unit performs control not to register, in the routing table, a routing information for communicating with the external apparatus.

13. The communication apparatus according to claim 12, wherein the at least one memory and the at least one processor further function as a receiving unit configured to receive a user operation of registering a correspondence relationship between the hostname and a communication interface to be used in a communication with a second external apparatus identified by the hostname, wherein the transmission unit further is configured to transmit the request for the name resolution of the hostname to a DNS server associated with the communication interface to be used based on the received user operation of registering the correspondence relationship, and wherein, in a case where the name resolution of the hostname for which the request is transmitted to the DNS server associated with the communication interface is successfully executed, the registration unit registers, in the routing table, the routing information for communicating with the external apparatus.

14. The communication apparatus according to claim 12, further comprising a reading unit configured to read a document.

15. The communication apparatus according to claim 14, wherein the transmission unit further is configured to transmit, to an external apparatus via a transmission application of the communication apparatus, an image acquired by the reading unit reading the document, and wherein the at least one memory and the at least one processor further function as a determining unit configured to determine a communication interface to be used in a communication based on the routing information registered in the routing table in a case where the hostname is designated as a transmission destination to be used in the transmission application and communication with the external apparatus identified by the IP address acquired as the result of the name resolution of the hostname is to be performed.

16. The communication apparatus according to claim 12, wherein the at least one memory and the at least one processor further function as:

a caching unit configured to cache, as cache, the result of the name resolution of the hostname in a storage, and an erasing unit configured to erase the result of the name resolution of the hostname having reached an expiration date of the cache, and to erase the routing information from the routing table in a case where the IP address acquired as the result of the name resolution of the hostname is registered as the routing information in the routing table at a time of erasing the result of the name resolution of the hostname.

17. The communication apparatus according to claim 12, wherein the registration unit registers the routing information in the routing table as static routing information registered in the routing table.

18. The communication apparatus according to claim 12, wherein the at least one memory and the at least one processor further function as a determination unit configured to determine, in a case where the name resolution of the hostname in response to the request transmitted by the transmission unit is successfully executed, whether a DNS server that successfully executed the name resolution of the hostname is the first DNS server.

19. The communication apparatus according to claim 12, wherein, in a case where the DNS server that successfully executed the name resolution of the hostname is not the first DNS server, the registration unit performs control so that the routing information to be registered in the routing table is information indicating that a communication interface used for the name resolution of the DNS server that successfully executed the name resolution of the hostname is to be used.

20. The communication apparatus according to claim 12, wherein the second network and the third network are connected to each other.

21. The communication apparatus according to claim 20, wherein the first network and the third network are not connected to each other.

22. The communication apparatus according to claim 20, wherein the first communication interface is connected to the first network, and the second communication interface is connected to the second network.

23. A non-transitory computer-readable storage medium storing a program for causing a computer processor to execute a method of controlling a communication apparatus to transmit data externally via a plurality of different communication interfaces, the method comprising:

transmitting a request for a name resolution of a hostname to at least a first Domain Name System (DNS) server located on a first network and a second DNS server located on a second network different from the first network in a case where a request for the name resolution of the hostname is received from an application of the communication apparatus; and controlling whether to register, in a routing table, routing information for communicating with an external apparatus identified by an Internet Protocol (IP) address acquired as a result of the name resolution of the hostname, based on whether a DNS server that successfully executed the name resolution of the hostname in response to the transmitted request is the first DNS server associated with a first communication interface to which a default gateway is set, wherein, in a case where the DNS server that successfully executed the name resolution of the hostname is not the first DNS server, and is the second DNS server, controlling includes performing control to register, in the routing table, a routing information for communicating with the external apparatus located on a third network, different from the first network and the second network, via a second communication interface associated with the second network, and wherein, in a case where the DNS server that successfully executed the name resolution of the hostname is the first DNS server, controlling includes performing control not to register, in the routing table, a routing information for communicating with the external apparatus.

* * * * *